US012271827B2

United States Patent
Horesh et al.

(10) Patent No.: US 12,271,827 B2
(45) Date of Patent: Apr. 8, 2025

(54) COMPUTER PREDICTION OF RELEVANT DATA FROM MULTIPLE DISPARATE SOURCES

(71) Applicant: Intuit Inc., Mountain View, CA (US)

(72) Inventors: Yair Horesh, Kfar Sava (IL); Alexander Zhicharevich, Petah Tikva (IL); Shlomi Medalion, Lod (IL); Natalie Bar Eliyahu, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 1196 days.

(21) Appl. No.: 17/086,317

(22) Filed: Oct. 30, 2020

(65) Prior Publication Data

US 2022/0138592 A1    May 5, 2022

(51) Int. Cl.
    *G06N 5/022*     (2023.01)
    *G06F 18/214*    (2023.01)
    *G06F 40/30*     (2020.01)
    *G06N 5/045*     (2023.01)
    *G06N 20/00*     (2019.01)

(52) U.S. Cl.
    CPC ........... *G06N 5/022* (2013.01); *G06F 18/214* (2023.01); *G06F 40/30* (2020.01); *G06N 5/045* (2013.01); *G06N 20/00* (2019.01)

(58) Field of Classification Search
    None
    See application file for complete search history.

(56) References Cited

U.S. PATENT DOCUMENTS

| | | | |
|---|---|---|---|
| 11,294,974 B1* | 4/2022 | Shukla | G06F 16/90335 |
| 11,868,436 B1* | 1/2024 | Gokalp | G06N 20/20 |
| 2015/0193699 A1* | 7/2015 | Kil | G06N 5/022 |
| | | | 706/12 |
| 2020/0372472 A1* | 11/2020 | Kenthapadi | G06F 16/24578 |

\* cited by examiner

*Primary Examiner* — Haimei Jiang
(74) *Attorney, Agent, or Firm* — Lathrop GPM LLP (57) ABSTRACT

A method including extracting data from disparate data sources. The data includes data pairs including a corresponding data point and a corresponding time associated with the corresponding data point. The method also includes extracting insights from the data at least by identifying a trend in the data pairs. The method also includes forming a model vector including the insights and an additional attribute to the insights. The additional attribute characterizes the insights. The additional attribute includes at least user feedback including a user ranking of a ranked subset of the insights from a user. The method also includes inputting the model vector into a trained insight machine learning model to obtain a predicted ranking of the insights. The method also includes selecting, based on the predicted user ranking, a pre-determined number of insights to form predicted relevant insights. The method also includes reporting the predicted relevant insights.

17 Claims, 6 Drawing Sheets

COMPUTER PREDICTION OF RELEVANT DATA FROM MULTIPLE DISPARATE SOURCES

BACKGROUND

With the pervasiveness of computing devices and the networking between computing devices, volumes of data are captured. For example, data may include metrics, user generated data from a variety of users, tracking data, sensor data amongst a variety of other types of data. Because of the volumes of data, identifying data relevant to a specific user is a challenge. Portions of the data relevant to one user may not be relevant to another user. A computer, by itself, has no mechanism for determining which part of the data is relevant to the user. Additionally, users may not know which portions of data are important or significant. Thus, a user may have little or no insight on how to find the relevant information.

For example, a user may be interested in finding a relevant information from the underlying data, but cannot command the computer to provide a conclusion. Thus, the user is relegated to guessing the portions of the data may be relevant and then making multiple queries of the data. The user manually attempt to arrive at the relevant information after viewing various aspects of the data in search of the relevant information. However, such a process is error prone as the user may not consider many aspects of the data.

The challenge increases when the relevant information is to be derived from multiple disparate data sources. In this case, different data from the disparate data sources are not easily compared.

SUMMARY

The one or more embodiments provide for a method. The method includes extracting data from disparate data sources. The data includes data pairs including a corresponding data point and a corresponding time associated with the corresponding data point. The method also includes extracting insights from the data at least by identifying a trend in the data pairs. The method also includes forming a model vector including the insights and an additional attribute to the insights. The additional attribute characterizes the insights. The additional attribute includes at least user feedback including a user ranking of a ranked subset of the insights from a user. The method also includes inputting the model vector into a trained insight machine learning model to obtain a predicted ranking of the insights. The method also includes selecting, based on the predicted user ranking, a pre-determined number of insights to form predicted relevant insights. The method also includes reporting the predicted relevant insights.

The one or more embodiments also provide for a system. The system includes a data repository. The data repository stores data from disparate data sources. The data includes data pairs including a corresponding data point and a corresponding time associated with the corresponding data point. The data repository also stores insights extracted from the data, the insights including a trend in the data pairs. The data repository also stores an additional attribute including a characterization of at least one of the insights. The additional attribute include at least a user feedback including user rankings, from a user, of a ranked subset of the insights. The data repository also stores a model vector including a data structure configured for input into a machine learning model, the model vector including the insights and the additional attribute. The data repository also stores a pre-determined threshold ranking. The data repository also stores a predicted ranking of the insights indicating a ranked order of the insights in order of predicted relevancy. The data repository also stores predicted relevant insights including members of the insights that have greater than the pre-determined threshold ranking in the predicted ranking. The system also includes a data extraction engine configured to extract the data from the disparate data sources. The system also includes an insight generation engine configured to extract the insights from the data, and form the model vector by adding the additional attribute to the insights. The system also includes a trained insight machine learning model configured to predict the predicted ranking. The system also includes an insight selector configured to select the predicted relevant insights from the predicted ranking, and report the predicted relevant insights.

The one or more embodiments also provide for another method. The method also includes generating reports including disparate information derived from a data set. The disparate information includes data points associated with corresponding associated times. The method also includes extracting insights from the reports. The insights include a trend selected from the group consisting of one or more of statistically significant trends, statistically significant cycles, and statistically significant outliers using the data pairs. The method also includes forming a model vector including the insights and an additional attribute to the insights. The additional attribute is outside the data set, and wherein the additional attribute at least includes a user-feedback regarding at least one of the insights. The method also includes inputting the model vector into a supervised machine learning regressor model. The method also includes generating, by the supervised machine learning regressor model, scores. The scores predict a corresponding relevancy of a corresponding insight. The method also includes generating a predicted ranking by ranking the scores. The method also includes selecting selected scores, from the predicted ranking, that exceed a threshold score. The selected scores correspond to predicted relevant insights. The method also includes inserting the predicted relevant insights into natural language sentences. The method also includes returning the natural language sentences.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the present application, the term "vector" is used to refer to a conceptual stored relationship between data. Various data structures may be used to implement the vector.

In general, embodiments of the invention relate to finding information relevant to a specific user when the information is either difficult to find or can only be inferred from an underlying data set composed of disparate sources of data. For example, a user might receive several different reports derived from a common set of data. However, the user might be interested in a cumulative summary or distillation of the reports with respect to a user's specific interest.

One or more embodiments are directed to a machine learning technique to predict relevant data. A model vector is generated for the data from the disparate data sources. The model vector is then enhanced with several types of data. Related data that is related to the disparate data sources may be added to the model vector. Derived data that is derived from the disparate data sources may be added to the model vector. Additionally, time-based data such as statistically significant trends, cycles, and outliers are analyzed from the disparate data sources, and then may be added to the model vector. Still further, statistical information as well as sentiment data (i.e. user-perceived judgements of the meaning of certain facts) may be also added to the model vector. Additional information of interest may also be added to the model vector. The result is a model vector having features (categories of information) and values (individual entries for each feature) that reflect not only the underlying data, but also statistical trends in the data as well as user-perceived sentiments about the data.

The model vector then serves as input in a machine learning model. The machine learning model outputs a prediction of which features in the model vector are most relevant to the user. Such features may be referred to as predicted features. The details of the operation of the machine learning model are described further below with respect to FIG. 2A through FIG. 3.

The predicted features are used to generate a simplified report for the user. For example, depending on the nature of the predicted feature, an appropriate pre-determined sentence structure is chosen automatically. Information about the predicted features is inserted into the pre-determined data structure. The completed sentences may be referred to as relevant reports. The relevant reports are then returned and can be displayed to the user.

As a brief example, a user may store the user's financial information using a financial management application. The financial management application may maintain a chart of accounts, and be capable of producing various financial reports intended for consumption by an expert accountant. However, a more novice user may desire a more distilled report that reflects the overall health of the user's business.

One or more embodiments may generate the reports and then treating the reports as the disparate data sources, as described above. The reports are formatted into the form of a model vector. Statistics and trends are added to the model vector, along with user-provided sentiment data. The model vector is provided as input to a supervised machine learning regression model that predicts which of the features in the model vector will be most relevant to the user. The predicted features are used to select a pre-determined sentence structure. Information from the predicted features are inserted into the pre-determined sentence structure. The resulting filled-out pre-determined sentence structure is a relevant report, which is returned to the user.

As a specific example, instead of reviewing complex financial reports, the user sees a simple message that is relevant to the user. More specifically, the user may view the following sentence, "Your second quarter income is improving year to year in the last five years." The bulk of the sentence is pre-determined, and selected based on the predicted features. The terms "improving" and "five" from the example sentence are inserted into the pre-determined sentence using information from the predicted features. In this manner, one or more embodiments provide a technique for a computer to assist a user to distill complex, extensive information from disparate data sources into one (or a few) sentences that are supported by the data, relevant, and clearly understandable to the user.

Note that the one or more embodiments are not limited to financial management applications. The financial management application example, described above, is presented merely to aid in understanding the operation of the one or more embodiments. The one or more embodiments are also applicable in many areas of data analysis. For example, the one or more embodiments could be applied in the area of defense by analyzing complex military reports and predicting relevant military goals or threats. The one or more embodiments could be applied in the area of medicine or other sciences by analyzing complex reports on the outcome of experiments and predicting relevant conclusions.

Figure 1:
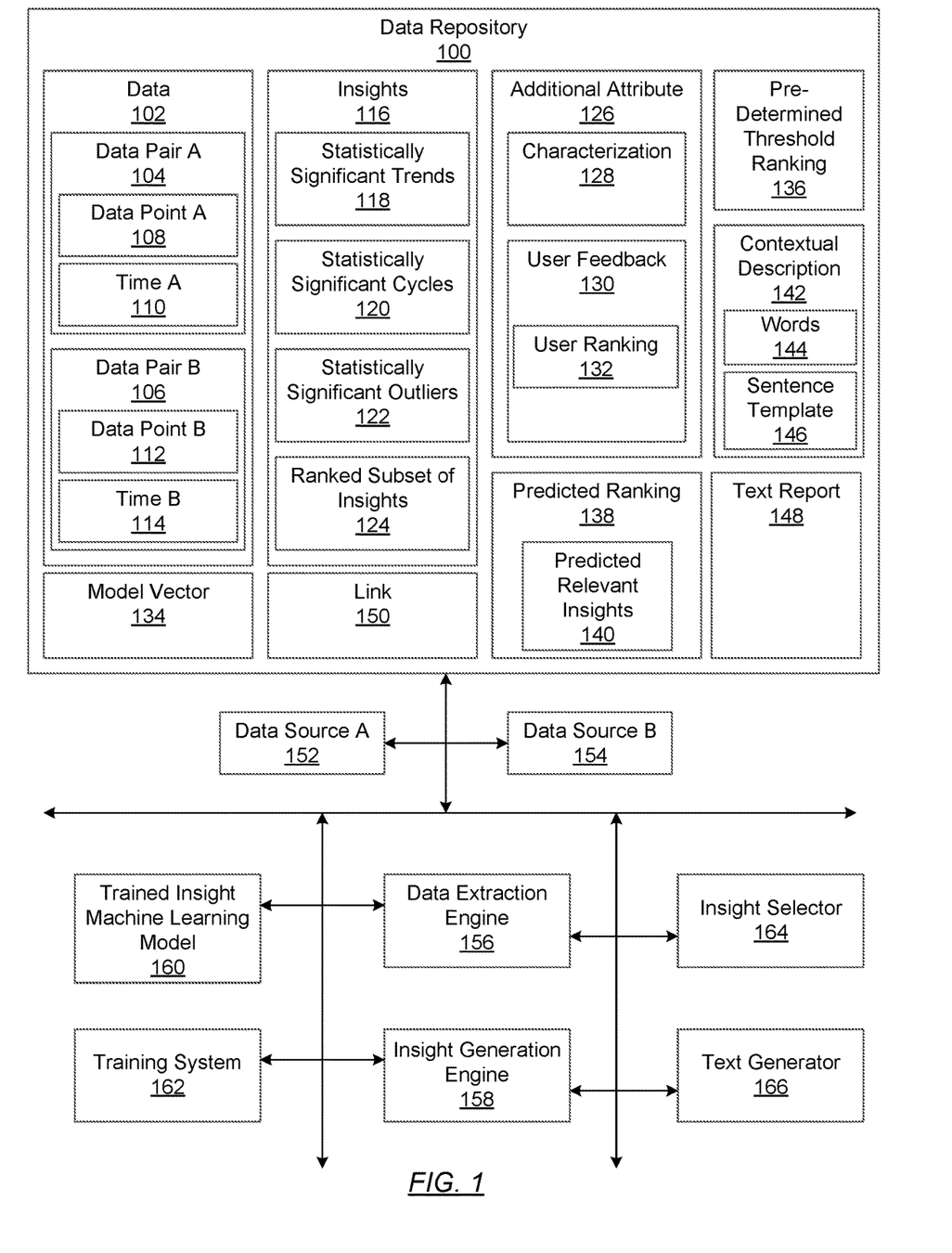
FIG. 1 shows a computing system, in accordance with one or more embodiments of the invention.

Attention is now turned to the figures. FIG. 1 shows a computing system, in accordance with one or more embodiments of the invention. The computing system includes a data repository (100). In one or more embodiments of the invention, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) stores data (102). As used herein, the data (102) refers to the underlying data upon which the disparate data sources are based or from which the disparate data is drawn. Thus, for example, the data (102) could be financial information upon which disparate reports are based. However, the data (102) could be a combination of multiple different data sets which, together, form the data (102). Note that the one or more embodiments contemplate that the data (102) is, at least in part, associated with times.

Thus, the data (102) is, at least in part, associated in data pairs. A data pair is a data point related, in storage, to an associated time value. For example, assume at least two data pairs are present, data pair A (104) and data pair B (106). In this example, the data pair A (104) includes data point A (108) that is associated with Time A (110). Similarly, the data pair B (106) includes data point B (112) that is associated with Time B (114). For example, the data point could be a bank account balance. The associated time value records a time that the bank account balance applied. Even more specifically, a data pair could be ($54,234.98, 5/10/20), which reflects a bank account balance associated with the time Oct. 5, 2020.

A data point, such as the data point A (108) or the data pair B (106), is an instance of data. As indicated above, the number $52,234.98 is a data point in a series of bank balances over time.

A time, such as the Time A (110) or the data point B (112), is a time associated with the data point. The time may be a timestamp assigned by a computer, or may be a user-designated time. As indicated above, the value "5/10/20" is a time stamp indicating the day, month, and year associated with the data point "$54,234.98").

Note that the one or more embodiments are not limited to data pairs. Thus, the data (102) may include many other types of data that are not associated with times. Such information is still relevant and may factor into the machine learning predictions below.

For example, a first user may indicate sentiment data. Sentiment data is one or more numbers that represent a user's value judgement of a number. For example, sentiment data may indicate that the dollar amount of $54,234.98 is "good" because, to the first user, the balance is judged to be high. A second user may judge that the same dollar amount is "bad," because the number is below an acceptable threshold for a different type of business. Thus, the sentiment data is based on a user perception of the meaning, to the user, of the data point.

Whatever the user's judgement, the sentiment data is useful in predicting relevant features according to the one or more embodiments, even though the data is not in the form of a time-based data pair, as described above. Thus, while the one or more embodiments contemplate the use of data pairs, such as data pair A (104) and data pair B (106), the data (102) is not limited to such data pairs.

The data (102) may include other types of information, and may be in multiple formats. For example, the data (102) may be from disparate data sources, and thus formatted differently or have different data structures. An example of disparate data sources may include reports that are generated based on the data (102). Note that the reports, themselves, may be considered part of the data (102). While the reports may be derived from the same underlying data, the reports are still disparate data sources because the reports are formatted differently or convey different information. Disparate data sources may also include data from different storage devices or data from different types of programs. Thus, for example, financial information and social media information may also be considered disparate data sources.

The data repository (100) also stores other types of information, such as derived information. Derived information is information that may be derived from underlying data, but cannot be queried directly from the underlying data. For example, the data repository (100) may store insights (116). As used herein, and "insight" is data that is derived from the data (102). Thus, for example, an insight could not be queried directly from the data (102), but may be derived from the data (102).

For example, the insights (116) may be statistically significant trends (118). The statistically significant trends (118) is defined as one or more trends that are, mathematically, statistically significant. A trend is a pattern in data over time. Statistical significance is defined mathematically. In statistical hypothesis testing, a result has statistical significance when the result is unlikely to have occurred given the null hypothesis. "Unlikely" is determined with respect to a numerical threshold. More precisely, a defined significance level, denoted by "a" is the probability of a prediction rejecting the null hypothesis, given that the null hypothesis was assumed to be true. The p-value of a result, "p", is the probability of obtaining a result at least as extreme, given that the null hypothesis is true. A result is statistically significant, according to a pre-determined standard, when $p \leq \alpha$. The significance level for a study is chosen before data collection, and is typically set to 5%, or lower.

The insights (116) may also be the statistically significant cycles (120). A cycle is a pattern of data results that repeat over time within some margin of error. A cycle is "statically significant" when, as defined above, the repeating pattern exists within a pre-defined error margin. Thus, a cycle is a type of trend.

The insights (116) may also be the statistically significant outliers (122). An outlier is one or more data points that exist outside of a detected pattern of data, whereby the detected pattern includes most data points within a pre-determined margin. Thus, a statistically significant outlier is a data point that lies outside a pre-determined range of data points. As a specific example, assume 10 financial transactions. Nine of the transactions are between $1 and $100. The tenth is $1000. The tenth transaction may be deemed a statistically significant outlier. The statistically significant outlier, by definition, lies outside of a trend.

The insights (116) may also include a ranked subset of insights (124). A "ranked subset of insights" is a list of two or more of the insights (116) that are ranked by relevance. The ranking may have been performed a user or by an automated process.

The data repository (100) also may include one or more additional attributes, such as additional attribute (126). As used herein, an "additional attribute" is data or metadata that is in the data (102) or is derived from the data (102), other than the insights (116) themselves.

An example of the additional attribute (126) is a characterization (128) of at least one of the insights (116). A characterization is a description or a user-supplied value judgement of an insight. For example, the characterization (128) may take the form of user feedback (130) that includes a user ranking (132) of one of the insights (116). As used herein, user feedback (130) user-provided information regarding the insights (116) or other data (102). As used herein, a user ranking (132) is user-designation indicating an importance or relevance of the insights (116) or other data (102). Thus, for example, the ranked subset of insights (124) may be generated automatically based on the user feedback (130) indicating the user ranking (132) of ones of the insights (116) and/or the data (102).

The additional attribute (126) may be other forms of data. For example, the additional attribute (126) may be a corresponding statistical P-value for each of the insights (116). The statistical P-value may be a personal P-value representing a degree of deviation of a corresponding insight relative to historical data for a corresponding attribute for the user. The statistical P-value may be a background P-value representing a degree of deviation of corresponding insight relative to historical data for a corresponding attribute for other users different than the user.

The additional attribute (126) may be a corresponding numerical representation of a sentiment associated with each of the insights (116). The corresponding numerical representation of the sentiment may be provided by the user. For example, a scale of one to five could be used to indicate the sentiment associated with the insights (116).

The additional attribute (126) may be an affiliation of an insight (116) to a type of data. For example, the statistically significant trends (118) may be affiliated with account balances for a business.

As can be seen from the above, the additional attribute (126) may take many different forms. In some embodiments, the additional attribute (126) may constitute more total data than the insights (116). The additional attribute (126) may be combinations of the above examples, or some other type of information. Thus, the additional attribute (126) may be referred to as additional data selected from additional sources other than the disparate data sources. In any case, the additional attribute (126) may be added to the model vector (134) prior to inputting the model vector (134) to the trained insight machine learning model (160), as described further below.

The data repository (100) also stores a model vector (134). The model vector (134) is defined as a vector configured for use as input to a machine learning model. A machine learning model is a program that has been trained to recognize certain types of patterns. Training of a machine learning model is described with respect to FIG. 2C. An example of the model vector (134) is a "one hot vector." A "one hot vector" may be a 1×N matrix used to distinguish each word in a vocabulary from every other word in the vocabulary. The vector is composed of features, with each feature represented by a single cell in the 1×N matrix. A value is the value in a cell. For a one hot vector, each value for each feature is either zero or one. Other types of machine learning data structures exist.

In an example, the model vector (134) includes one or more examples of the data (102) and/or the insights (116). In a specific example, the model vector (134) includes the insights (116) and the additional attribute (126), along with the data pairs expressed in the data (102). The model vector (134) may include other types of information, taken from the data (102).

The data repository (100) also may store a pre-determined threshold ranking (136). The pre-determined threshold ranking (136) is a number reflecting a minimum prediction of relevance. Thus, for example, if a predicted relevancy of a particular feature in the model vector (134) is below the pre-determined threshold ranking (136), then the feature is predicted to be "not relevant". Similarly, if the predicted relevancy of a particular feature in the model vector (134) is above the pre-determined threshold ranking (136), then the feature is predicted to be "relevant."

Note that, in one embodiment, a separate prediction of relevancy is made for many or all of the features in the model vector (134). The predictions of relevancy may be ranked by the computer. Thus, for example, the data repository (100) may also store a predicted ranking (138) of the insights (116). The predicted ranking (138) indicates a ranked order of the insights (116) in order of predicted relevancy of the insights (116).

Of interest is a subset of the insights (116) within the predicted ranking (138). Specifically the predicted relevant insights (140) are members of the predicted ranking (138) of the insights (116) that have predicted relevancies that are above the pre-determined threshold ranking (136). In an embodiment, the other, less relevant ones of the insights (116) are discarded. In this case, the predicted ranking (138) is of the predicted relevant insights (140).

The data repository (100) may store information related to the reporting and use of a prediction of the machine learning model. Thus, for example, the data repository (100) may store a contextual description (142). A contextual description (142) is one or more sentences written in natural language. Thus, a contextual description (142) is formed from one or more words (144). The contextual description (142) may be built from a sentence template (146). A sentence template (146) is a set of the words (144), together with blank fields that can be filled with a variety of natural language words. The blank fields are selectable by the computer based on the predicted ranking (138).

Together, the contextual description (142) may be presented to the user in the form of a text report (148). A text report (148) is a human-readable natural language presentation of one or more the contextual description (142) combined together using the words (144) and the sentence template (146).

Thus, for example, a text report may read "Your second quarter income is improving year to year in the last five years; your growth is primarily attributed to increased sales of gizmos." Both independent clauses in the text report are built using individual sentences, where the terms "improving", "five", "growth", and "gizmos" were blank fields that were filled in by the computer using the predicted ranking (138) and/or other features that were predicted to have relevancies above the pre-determined threshold ranking (136).

The text report (148) may include additional information, or may be associated with additional information. For example, one or more links, such as link (150), may be placed in or otherwise associated with the text report (148). As used herein, the link (150) is a hyperlink or other automatic reference selectable by a user. When the link (150) is selected by the user, the computer uses information in the link (150) to direct the user to other information.

In this manner, for example, the user may select the link (150), whereupon the computer displays underlying information in the data (102) that supports the text report (148). For example, the link (150) may be to a table or graph which compares sales of the gizmos over time, sales of other company products over time, and overall company sales over time. In another example, the link (150) may cause the computer to display a chart of accounts, a particular financial report, etc.

The system shown in FIG. 1 may include other components, in addition to the data repository (100). As indicated above, the disparate data sources may be different data repositories, such as a data source A (152) or a data source B (154). The data source A (152) and the data source B (154) may store information of use to a machine learning model, and may be in a variety of different data formats. Note that, in some embodiments, the disparate data sources may be reports generated using the data (102) and/or the data pairs and/or the insights (116), as described above. Thus, the term "disparate data source" may or may not refer to data repositories that are physically or logically separated from the data repository (100). Therefore, in some embodiments, the data source A (152) and/or the data source B (154) may be stored on the data repository (100).

The system shown in FIG. 1 also includes a data extraction engine (156). The data extraction engine (156) is software, application specific hardware, or a combination thereof. The data extraction engine (156) is configured to extract the data (102) from the data source A (152) and the data source B (154). The process of data extraction is described with respect to FIG. 2A.

The system shown in FIG. 1 also includes an insight generation engine (158). The insight generation engine (158) is software, application specific hardware, or a combination thereof. The insight generation engine (158) is configured to extract the insights (116) from the data (102). The insight generation engine (158) is also configured to form the model vector (134) by adding the additional attribute (126) to the insights (116). The operational details of the insight generation engine (158) are described with respect to FIG. 2A.

The system shown in FIG. 1 may also include a trained insight machine learning model (160). The trained insight machine learning model (160) is a machine learning model that takes the form of software and/or application specific hardware. The trained insight machine learning model (160) may be a supervised machine learning model, such as an XGBoost regressor machine learning model or other type of regressor machine learning model. The trained insight machine learning model (160) is trained to predict the predicted ranking (138). The operation of the trained insight machine learning model (160) is described with respect to FIG. 2A.

Note that the trained insight machine learning model (160) may also be an unsupervised machine learning model in the case that the underlying data is treated as a classification problem, rather than as a regression problem. Additional description regarding the use of an unsupervised machine learning model is described after the description of FIG. 4.

The system shown in FIG. 1 may also include a training system (162). The training system (162) is software and/or application specific hardware that is configured to train an untrained insight machine learning model into the trained insight machine learning model (160). Training of the trained insight machine learning model (160) is described with respect to FIG. 2C.

The system shown in FIG. 1 may also include an insight selector (164). The insight selector (164) is software and/or application specific hardware that is configured to select the predicted relevant insights (140) from the predicted ranking (138). The trained insight machine learning model (160) also is configured to report the predicted relevant insights (140). Operation of the insight selector (164) is described with respect to FIG. 2A.

The system shown in FIG. 1 may also include a text generator (166). The text generator (166) is software and/or application specific hardware that is configured to generate the text report (148). Thus, for example, the text generator (166) is configured to create a corresponding contextual description (142) for each of the insights (116) by inserting one or more words (144) from the insights (116) into sentence templates, such as the sentence template (146). The text generator (166) also is configured to publish a text report including the corresponding contextual description (142). The operation of the text generator (166) is described further with respect to FIG. 2A.

While FIG. 1 shows a configuration of components, other configurations may be used without departing from the scope of the invention. For example, various components may be combined to create a single component. As another example, the functionality performed by a single component may be performed by two or more components.

Figure 2A:
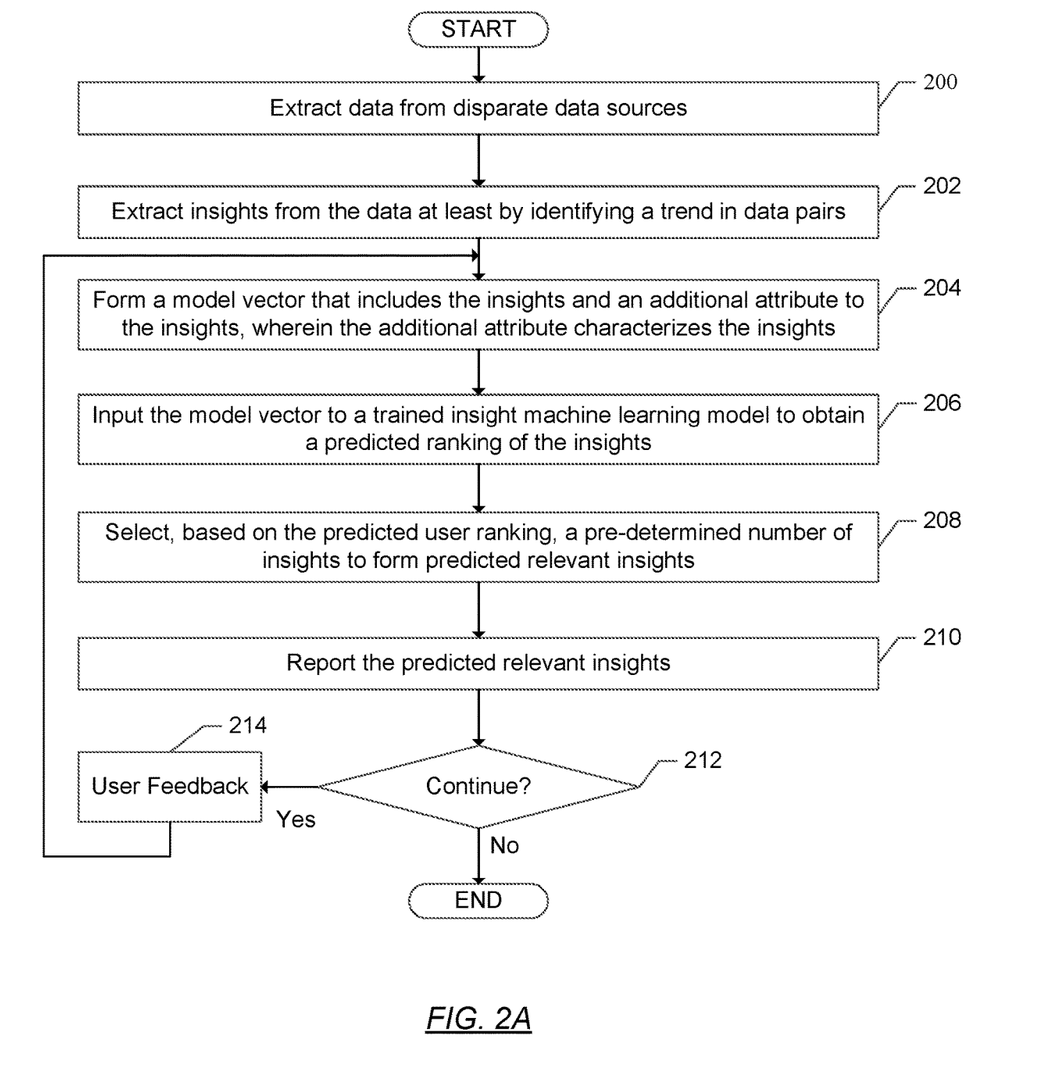
FIG. 2A, FIG. 2B, FIG. 2C, and FIG. 3 show computer-implemented methods, in accordance with one or more embodiments of the invention.
Figure 2B:
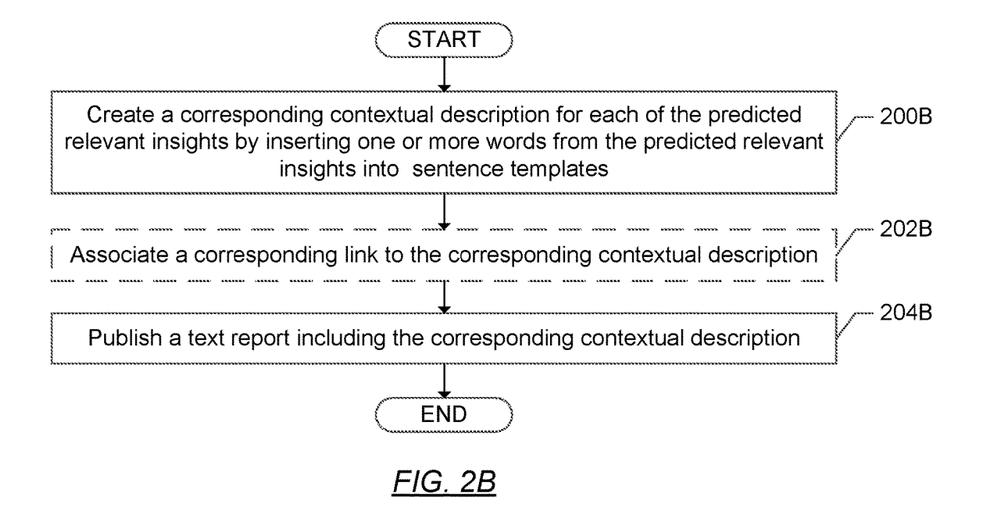
Figure 2C:
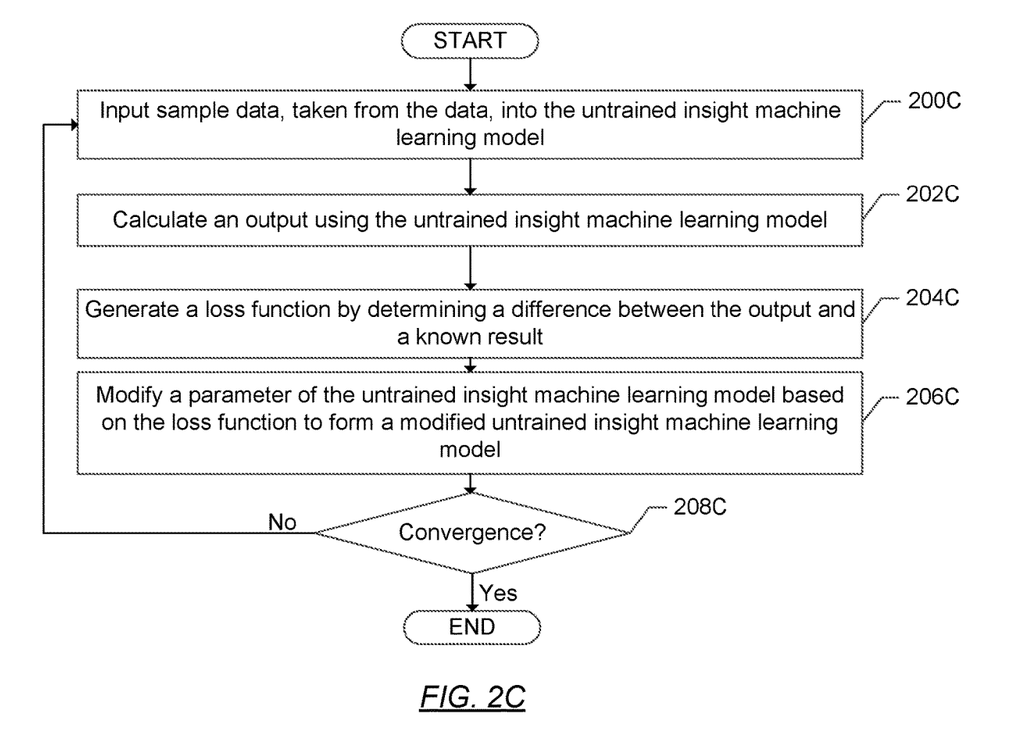
Figure 3:
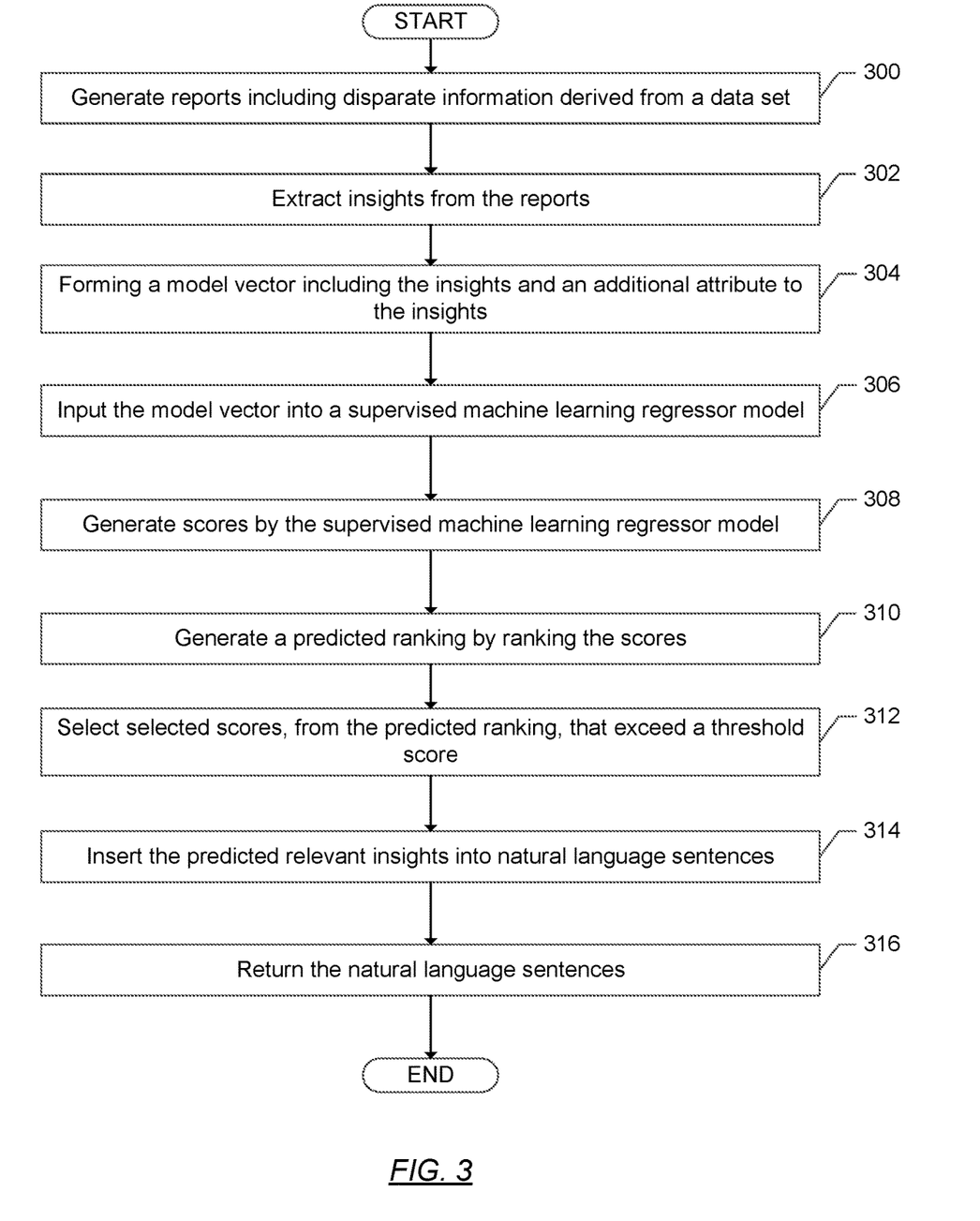

FIG. 2A through FIG. 3 are flowcharts, in accordance with one or more embodiments. The methods of FIG. 2A through FIG. 3 may be performed using the system shown in FIG. 1, or the computing environment shown in FIG. 5A and FIG. 5B.

Attention is first turned to FIG. 2A. At step 200, data is extracted from the disparate data sources. In an embodiment, the data includes data pairs having a corresponding data point and a corresponding time associated with the corresponding data point.

The data may be extracted using a number of different techniques, depending on the nature of the data being extracted, or from where the data is being extracted. If the disparate data sources are data repositories external to the underlying data from which the data pairs are drawn, then extracting the data may include querying the external data sources for desired data. If the disparate data sources are related to the underlying data from which the data pairs are extracted, then extracting the data may include directly analyzing or querying the data.

Extracting the data from the disparate data sources may also include running pre-existing report algorithms on the data. In this case, each of the resulting reports becomes a disparate data source. As a specific example, a financial management application may have a number of different pre-determined algorithms for producing expense reports, income reports, tax reports, etc. Each such report draws from the underlying data. Each such report forms one of the disparate data sources, in some embodiments.

At step 202, insights are extracted from the data at least by identifying a trend in the data pairs. The insights may be extracted by preforming pre-determined algorithms on the disparate data sources, and in particular on the data pairs. For example, a pre-determined algorithm may be programmed to identify any one of the statistically significant trends (118), the statistically significant cycles (120), or the statistically significant outliers (122) mentioned in FIG. 1. The insights may also be taken from past user characterizations of data, past reports, or past trends analyzed on older data.

At step 204, a model vector is formed that includes the insights and an additional attribute to the insights, wherein the additional attribute characterizes the insights. The additional attribute includes at least user feedback including a user ranking of a ranked subset of the insights from a user.

The model vector may be formed by converting the insights and the additional attribute(s) into a one dimensional matrix composed of features. The features are configured to have binary values, such as zero and one. For example, an attribute might be a user value judgement of a bank balance, with the value judgment being "good" or "bad." Such data can be represented as a feature labeled to reference "value judgement," with a "1" representing "good" and "0" representing bad. Data in the form of ranges may be represented as smaller sub-ranges so that a datum can be expressed as being a binary number within a smaller sub-range. Thus, for example, if the attribute expressed as a five-star rating indicating a value judgement of the user, then the information may be represented as five separate features, one for each star rating. An entry of "1" in one of the five features indicates the star rating in question, and an entry of "0" in the other four features indicates no star rating of that value for that feature.

Thus, at step 204, a data structure transformation takes place. Data represented in some other format for another purpose (e.g., presenting a user ranking of a bank balance) can be transformed into a one-dimensional matrix of features. The one-dimensional matrix is the model vector, and is suitable for being input to a machine learning model. The model vector may be a one hot vector in some embodiments.

At step 206, the model vector is input to a trained insight machine learning model to obtain a predicted ranking of the insights. The training of the trained insight machine learning model is described with respect to FIG. 2C.

In an embodiment, the trained insight machine learning model is a supervised machine learning model configured for a regression analysis of the model vector. In supervised learning, each example is a pair including the model vector and a desired output value, also called the supervisory signal. Training the supervised learning algorithm produced an inferred function, which now is used for mapping new examples. The algorithm uses the inferred function to attempt to correctly determine the class labels for unseen instances. Thus, the machine learning model generalizes from the training data to the unknown data in the model vector.

Given a set of N training examples of the form $\{(x_1,y_1), \ldots (x_n,y_n)\}$, such that $X_i$ is the model vector of the $i^{th}$ example and $y_i$ is the label, a supervised machine learning model seeks a function, g: $X \rightarrow Y$, where X is the input space and Y is the output space. The function, g, is an element of some space of possible functions, G, called the hypothesis space. The function, g, may be represented using a scoring function f: $X \times Y \rightarrow R$ (where R is real numbers), such that g is defined as returning the y value that gives the highest score: $g(x)=\arg \max f(x,y)$. Let F denote the space of scoring functions. Although G and F can be any space of functions, g takes the form of a logistic regression conditional probability model $g(x)=P(x|y)$.

Stated qualitatively, the machine learning model finds patterns in the unknown input data comparable to similar patterns found in the known training data. To use an oversimplified example, the machine learning model might analyze the properties of input data reflecting a shape, compare the input data to similar properties of known data of known shapes, and predict probabilities that the input data correspond to the various known shapes. The highest predicted probability may be selected as the predicted shape.

A similar process takes place with respect to finding patterns in the insights and the data pairs. The machine learning model compares the unknown data to known data and finds similar matching patterns. The output of the machine learning model is a prediction, or multiple predictions, that the model vector is comparable to one or more of the learned patterns that correspond to a user's value judgement of underlying data. In this manner, the machine learning model can obtain a predicted ranking of the insights, where higher rankings indicate the probability that the user will assign a value judgement to the underlying data.

Additionally, the machine learning model can also predict a probability that the user will deem a particular insight to be relevant, and the degree to which the user will consider the particular insight to be relevant. For example, the machine learning model, using the pattern recognition techniques described above, may determine that the financial growth of the user's business over a selected time period will be deemed by the user to be highly relevant. The relevancy score for the financial growth over the selected time indicates not only that the user is likely to consider the information relevant to the user, but also the degree to which the user will believe that the information is relevant to the user. The relevancy score for the financial growth over the second time may, based on a first relevancy score, be more or less relevant that some other feature, such as the user's bank account, the relevance of which is predicted by a second relevancy score.

At step 208, a pre-determined number of insights are selected, based on the predicted user rankings, to form predicted relevant insights. The pre-determined number of insights may be selected based on a threshold ranking. For example, only those insights predicted to have a ranking above a threshold number are selected as being selected relevant insights. The selected relevant insights are then chosen as being the insights that will be of most relevance to the user.

At step 210, the predicted relevant insights are reported. Reporting the relevant insights may be performed by displaying the relevant insights to the user. Reporting may also be performed by storing the relevant insights, or feeding back the relevant insights into another iteration of execution of the machine learning model, as explained below. Reporting may also be performed according to the method of FIG. 2B, below.

Note that steps 204 through 210 may be performed multiple times, depending on additional user feedback. For example, a result may be obtained at step 210, and then at step 212*a* determination is made whether to continue. If the decision to continue is "yes," then at step 214, user feedback is obtained. For example, the user may be prompted to rank the reported predicted relevant insights on a scale of one to five. The user feedback is then added as additional attributes to the model vector at step 204, and the method repeats. Otherwise, if a "no" answer results at step 212, then the method of FIG. 2A may terminate.

In addition, assuming a "yes" decision at step 212, the predicted relevant insights, themselves, may be added as additional values and to the model vector. In other words, the relevant insight becomes one of the participating insights compared by the machine learning model. The process again iterates, at least through to step 212.

Thus, the method of FIG. 2A may also include adding the predicted relevant insights to the model vector to form an enhanced model vector. The enhanced model vector is input to the trained insight machine learning model. A second pre-determined number of insights are re-selected as second predicted relevant insights. The second predicted relevant insights are reported.

Attention is now turned to FIG. 2B. FIG. 2B is a method of generating a user-readable report based on the predicted relevant insights determined at step 210 in FIG. 2A.

At step 200B, a corresponding contextual description is created for each of the predicted relevant insights by inserting one or more words from the predicted relevant insights into sentence templates. The selection of the sentence and the selection of the word are both based on the predicted relevant insights.

For example, if the predicted relevant insights re "growth" and "five", where the word "five" relates to a time period in years, then a policy or rule may be used to determine that a specific sentence is to be selected for the particular combination of words. For example, the selected pre-determined sentence may be "Your business has undergone over the last years." The relevant insights are then added to the appropriate blanks. Thus, the word "growth" is inserted into the first blank, and the word "five" is inserted into the second blank. The resulting sentence is "Your business has undergone growth over the last five years." The resulting sentence is the text report.

At optional step 202B, a corresponding link may be associated to the corresponding contextual description. The link may be embedded to appear as the text, the inserted words may be highlighted as separate links, or one or more links may be inserted below the text. The link may be a widget selectable to display at least one of the predicted relevant insights and the data from the disparate sources. In any case, the link is selectable by the user to find additional information, such as to find the underlying data or charts or trends that support the report.

At step 204B, a text report is published, including the corresponding contextual description. The text report may be published by displaying the text report to a user, sending the user an email, or storing the text report. In one embodiment, the method of FIG. 2B may terminate thereafter.

Attention is now turned to FIG. 2C. The method of FIG. 2C is a method of training the trained insight machine learning model (160) of FIG. 1.

At step 200C, sample data, taken from the data, is input into the untrained insight machine learning model. The sample data is input into the untrained insight machine learning model by converting the sample data into a training vector, similar in structure to the model vector (134) of FIG. 1. The difference between the two vectors is that the training vector uses sample data for which the ultimate answer is already known. In other words, the data scientist already knows the result of the data (e.g., the relevancy ratings of the various features in the training vector). However, untrained insight machine learning model will be nevertheless programmed to predict the relevancy ratings of the various features in the training vector.

Thus, at step 202C, an output is calculated using the untrained insight machine learning model. The output is calculated, using the training vector as input, using the techniques described above with respect to step 206 of FIG. 2A.

At step 204C, a loss function is generated by determining a difference between the output and a known result. In many cases, the predicted relevancy ratings output of the machine learning model does not perfectly match the known relevancy ratings of the features. Thus, a quantitative difference can be assessed between the output (i.e., the relevancy ratings of features as predicted by the machine learning model) and the known results (i.e., the known relevancy ratings of the features). In other words, the loss function is a measure of how good a prediction model does in terms of being able to predict the expected outcome.

For regression losses, such as in the type of supervised machine learning contemplated by the one or more embodiments, a loss function may be expressed as the mean square error (MSE). The $$MSE = \frac{\sum_{i=1}^{n}(y_i - \hat{y}_i)^2}{n},$$

where "n" is the number of training examples; "i" is the $i^{th}$ training example in a data set; $y_i$ is the ground truth label for the $i^{th}$ training example; and $\hat{y}_i$ is the prediction for the $i^{th}$ training example.

At step 206C, a parameter of the untrained insight machine learning model is modified based on the loss function to form a modified untrained insight machine learning model. In most cases, multiple parameters of the untrained insight machine learning model may be modified. In the case of the supervised machine learning model contemplated by the one or more embodiments, the parameters are the parameters of the regression model, which may be a binary logistic regression model or a sigmoid function model, such as a probit model. Specifically, the parameters of such models are the coefficients of the mathematical equation that defines the model. By changing the coefficients of the mathematical equation that defines the model, the results of the model will change. In a sense, the model itself is changed because the coefficients change.

For this reason, the untrained insight machine learning model is changed to an intermediate insight machine learning model, which will not produce the same predicted results of relevancies of the features as the prior untrained insight machine learning model. Thus, the intermediate insight machine learning model is to be re-evaluated.

Thus, at step 208C, a determination is made whether convergence has occurred. Convergence occurs when the difference between the output of the intermediate insight machine learning model and the known results changes by less than a threshold amount relative to the difference between the output of the prior intermediate insight untrained insight machine learning model and the known results. In other words, changing the parameters resulted in little change in the predicted relevancies. Stated still differently, the intermediate insight machine learning model is not becoming more accurate during the iteration process, compared to the known relevancy predictions, despite the change in the parameter(s) of the model.

If convergence has not occurred at step 208C, then the process returns to step 200C. The method is iteratively performed until convergence does occur at step 208C. Upon convergence, the method of FIG. 2C (i.e. the process of training the insight machine learning model) terminates. Once convergence has occurred, the insight machine learning model is now referred-to as the trained insight machine learning model.

Note that the process of training the machine learning model is not necessarily a one-time event. As the machine learning model is used in predicting the relevancy of the underlying data to the user, the user may be prompted for user feedback. For example, the user may be asked whether the report is deemed relevant to the user. The user may respond with a relevancy ranking between one and five, or some other scale.

After user feedback is received, another training process may be executed. The user feedback is included in the input model vector that is provided to the next intermediate insight machine learning model. In this manner, the user feedback is effectively incorporated in the loss function, which in turn drives changes to the parameters of the machine learning model. As the user continues to provide feedback over multiple iterations of training, the loss function is improved and thus the parameters are mathematically optimized to generate an output that more closely matches the user's perception of what information is relevant.

Attention is now turned to FIG. 3, which describes an alternative method to the method described in FIG. 2A. The method of FIG. 3 is a more specific example in the context of the use of an unrelated software program that generates various reports based on the underlying data.

At step 300, the unrelated software program generates reports, including disparate information derived from a data set. The disparate information includes data points associated with corresponding associated times. A specific example of how to generate the reports is described with respect to FIG. 4.

At step 302, insights are extracted from the reports. The insights include a trend. Examples of the trend include one or more of statistically significant trends, statistically significant cycles, and statistically significant outliers using the data pairs. The insights may be extracted from the reports in the manner described with respect to FIG. 2A, step 202.

At step 304, a model vector is formed, including the insights and an additional attribute added to the insights. The additional attribute is outside the data set. The additional attribute at least includes a user-feedback regarding at least one of the plurality of insights. The model vector may be formed in the manner described with respect to FIG. 2A, step 204.

At step 306, the model vector is input into a supervised machine learning regressor model. The model vector may be input into the supervised machine learning regressor model in the manner described with respect to FIG. 2A, step 206.

At step 308, scores are generated, by the supervised machine learning regressor model. The scores predict a corresponding relevancy of a corresponding insight. In other words, the scores are the output of the supervised machine learning regressor model.

At step 310, a predicted ranking is generated by ranking the scores. In other words, the scores are ranked to generate an ordered list of scores. The scores may be ranked from most likely to be relevant, to least likely to be relevant, though other orderings are possible.

At step 312, selected scores are selected from the predicted ranking, that exceed a threshold score. In other words, those scores that exceed a threshold value are identified as selected scores. The selected scores correspond to the predicted relevant insights.

At step 314, the predicted relevant insights are inserted into natural language sentences. The predicted relevant insights may be inserted into natural language sentences in the manner described with respect to FIG. 2B, step 200B.

At step 316, the natural language sentences are returned. Returning the natural language sentences may include publishing a text report, as described with respect to FIG. 2, step 204B. Returning the natural language sentences may also including displaying the natural language sentences to the user, sending an automatic email to the user, storing the natural language sentences, etc. In one embodiment, the method of FIG. 3 may terminate thereafter.

While the various steps in the flowcharts of FIG. 2A through FIG. 3 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. Thus, the one or more embodiments are not necessarily limited by the examples provided herein.

Figure 4:
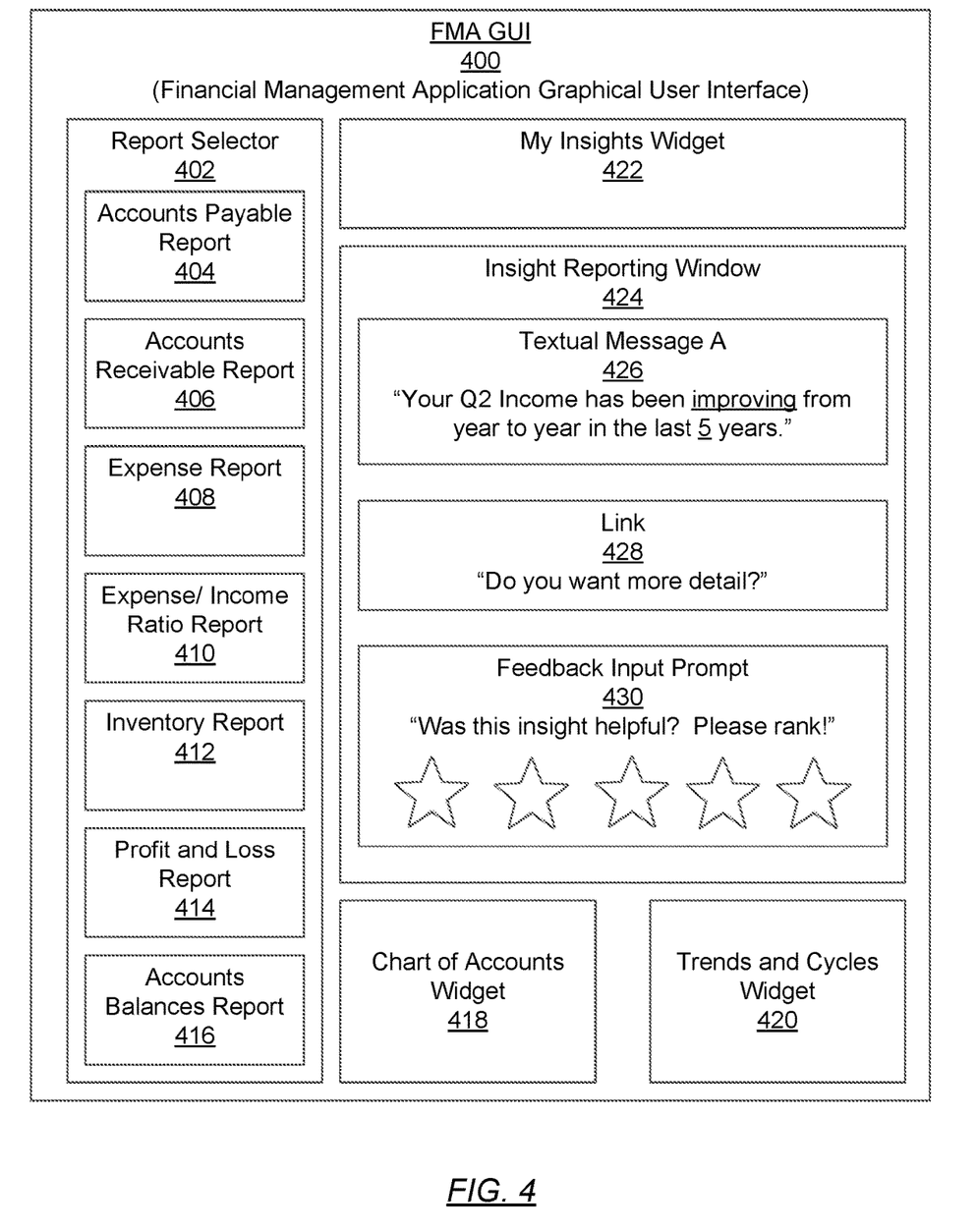
FIG. 4 shows a sample graphical user interface demonstrating a method of finding relevant data from multiple disparate reports, in accordance with one or more embodiments of the invention.

Attention is now turned to FIG. 4. FIG. 4 shows a sample graphical user interface demonstrating a method of finding relevant data from multiple disparate reports, in accordance with one or more embodiments of the invention. Thus, FIG. 4 is a specific operational example of the one or more embodiments. However, as indicated earlier, the one or more embodiments have broader applications and are not necessarily limited to the context of financial management or business management. Rather, the one or more embodiments improve a computer as a tool by showing how the computer may be programmed to distill information that is of specific relevance to a specific user.

In the example of FIG. 4, the user uses a FMA GUI (400). The term "FMA" stands for "financial management application." The term "GUI" stands for "graphical user interface." Thus, the FMA GUI (400) is an example of what a user sees when interacting with the FMA.

The FMA GUI (400) includes a number of widgets. In the context of software, a "widget" is a software application that is designed to provide a specific piece of information or a specific function, such as to activate a command. A widget may take the form of a button, a slide, a box, etc.

One of the widgets in the FMA GUI (400) is a report selector (402). The report selector (402) is a widget, or an ascetic box grouping several widgets. The report selector (402) indicates different reports that may be available. Each indicated report may be a widget that, when actuated by the user, activates a logical software application that produces the indicated subject matter. For example, the report selector (402) may include an accounts payable report (404), an accounts receivable report (406), an expense report (408), an expense/income ratio report (410), an inventory report (412), a profit and loss report (414), and an account balances report (416). If a user selects one of the widgets in the report selector (402) (or selects the report selector (402) if the report selector (402) is a widget), then corresponding software programs will perform the data manipulation that will present the respective report to the user.

Other widgets may be available. For example, the user may be able to select a chart of accounts widget (418) or a trends and cycles widget (420). The chart of accounts widget (418) may be selected to display to the user a chart of accounts of the user's business. The trends and cycles widget (420) may be selected to display trends or cycles in the user's business financials.

The one or more embodiments recognize that the user of the FMA GUI (400) may be unsatisfied with the various reports described above. While the reports are accurate and formatted in accordance with accepted accounting practices, an unsophisticated user may have difficulty distilling the reports or the underlying data to find information that the user deems relevant. The problem is made more difficult because the user may not know or understand what the user is looking for. Thus, the user may have a desire to have a greater understanding regarding the financial state of the user's business, but the user might not know the right questions to ask or the proper terminology to ask the right questions to find the relevant information.

Thus, the FMA GUI (400) is provided with a My Insights Widget (422). The My Insights Widget (422), when selected, calls a software program that executes computer code that implements the one or more embodiments described above. In particular, when the My Insights Widget (422) is selected, the FMA GUI (400) may, separately or concurrently, run one, some, or all of the various reports in the report selector (402), or the chart of accounts widget (418), the trends and cycles widget (420). Each such report or type of information becomes a separate instance of disparate data sources. Each report is a disparate data source, because while the underlying data that is used to form each report is the same, each report is formatted and presented differently.

As described with respect to FIG. 2A or FIG. 3, the software extracts data from the disparate data sources and insights from the data that identifies a trend in data pairs of data points and times. A data structure, in the form of a model vector, is populated using the extracted insights. Additional attributes are added to the insights in the model vector. The additional attributes may characterize the insights, such as to indicate an assigned or guessed relevance for one or more of the features in the model vector.

The model vector is then input to a trained insight machine learning model to obtain a predicted ranking of the insights. A pre-determined number of the insights are selected, based on the user ranking, to form predicted relevant insights. In particular, in this example, the relevant insights are reported in the form of natural language text sentences. The natural language text sentences are based on pre-determined sentences having blanks. The blanks are filled-in according to the predicted relevant insights, as described with respect to FIG. 2A.

Thus, an example of reporting the relevant insights may be to display the natural language text sentences in the insight reporting window (424). The insight reporting window (424) displays one or more textual messages. In the example of FIG. 4, one textual message is shown, textual message A (426). In this specific example, the user sees the textual message A (426) as "Your Q2 income has been improving from year to year in the last 5 years." The underlined text (i.e., "improving" and "5") indicates the blanks that were filled in according to the one or more embodiments. Thus, the user sees a clear message that conveys the information that is predicted to be relevant to the user.

In addition, a link (428) is shown in the insight reporting window (424). The link (428) is associated with a user prompt in the form of text stating, "Do you want more detail?" If the user selects the link, the FMA GUI (400) will cause software to display charts, tables, or even the underlying data to support the conclusion stated in the textual message A (426).

In order to increase the reliability of the predicted relevance of the textual message A (426), the insight reporting window (424) may also include a feedback input prompt (430). The feedback input prompt (430) is associated with another user prompt in the form of text stating, "Was this insight helpful? Please rank!" The user is presented with five stars, with the implication that the more stars the user selects the more relevant the user found the textual message A (426) to be.

The user selection is then taken as feedback. The feedback is provided as additional input to the supervised machine learning model operating in the background to predict features that the user will deem to be relevant. The more the user uses the My Insights Widget (422), and the more feedback the user provides, the more reliable the prediction of relevancy made by the supervised machine learning model. Thus, over time, the supervised machine learning model "learns" what the specific user deems to be relevant, and is more likely to provide the kind of information that the user is looking for—without the user having to know what questions to ask to find the information deemed by the user to be relevant.

As mentioned above, the one or more embodiments are not necessarily limited to financial management software embodiments. Additionally, the one or more embodiments are not limited to the use of a supervised regressor machine learning model.

Attention is now turned to an alternative embodiment which uses an unsupervised machine learning model, treating the data analysis as a classification problem rather than as a regression analysis problem. In the second embodiment, the report of the predicted relevant information, itself, becomes the basis of the classification problem. In other words, the report itself is treated as an insight to be classified as being in one of several categories of relevance (e.g., relevant on a scale of 1-5). Thus, over time as user feedback is received, reports are classified using unsupervised machine learning techniques according to a relevance scheme. When the user asks for a new distillation of the various reports using the My Insights Widget (422), reports classified by the unsupervised machine learning model as having the highest relevancy ranking will be returned to the user.

Thus, in the alternative embodiment, a report is a single data item which is composed of a set of insights. The data item (i.e., report) is labeled according to how the user scores the report as being relevant. The top N insights that formed the report can be classified as the basis for relevancy. The unsupervised machine learning model, trained using past reports, can then classify pre-existing report templates as being of higher or lower relevancy to the user.

One way to view the difference between the embodiment described with respect to FIG. 2A and FIG. 3 is to consider that, in the first embodiment, a row of data (i.e., the model vector) is a particular insight and some user related attributes. In the alternative approach, the row of data (i.e. the model vector) is the report, together with additional attributes. In the first approach, insights and attributes are used to determine what insights are relevant, sentences are selected with blanks filled in based on the predicted relevant insights, and then the sentences reported. In the second approach, the reports themselves are classified according to relevancy based on user feedback. The most relevant report from among many can then be presented to the user, with specific information filled-in for the presented report.

Thus, while the one or more embodiments described with respect to FIG. 1 through FIG. 4 contemplate the use of a supervised machine learning model, the one or more embodiments also contemplate the use of unsupervised machine learning models to achieve a similar function. Accordingly, the one or more embodiments are not necessarily limited to the embodiments described with respect to the use of a supervised machine learning model.

Figure 5A:
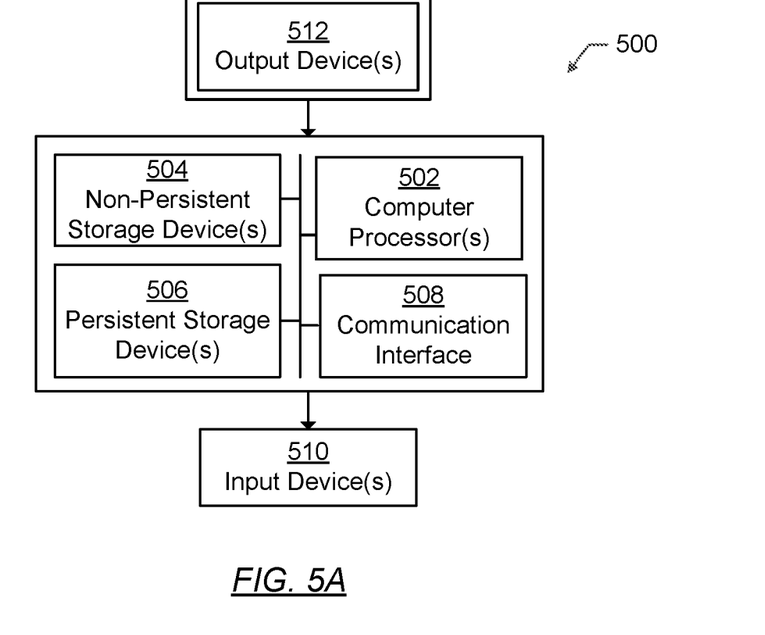
FIG. 5A and FIG. 5B show a computing system environment, in accordance with one or more embodiments of the invention.
Figure 5B:
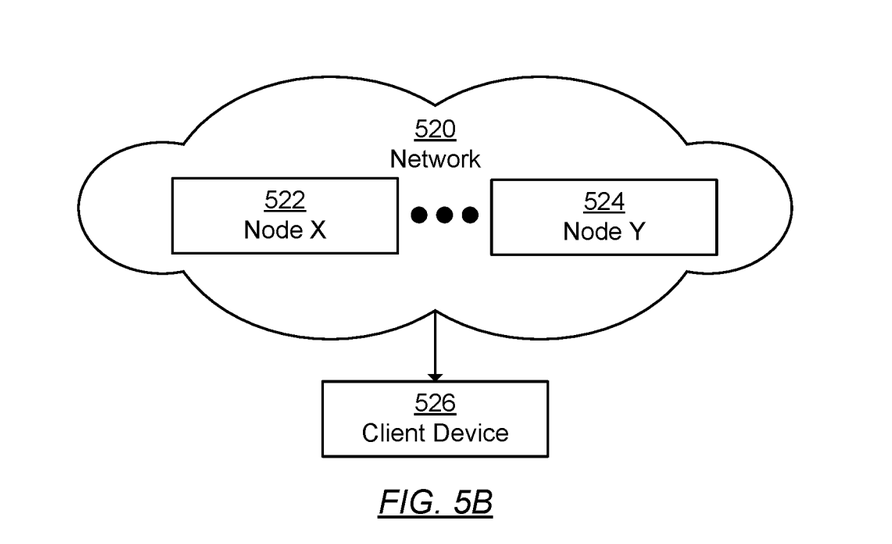

FIG. 5A and FIG. 5B are examples of a computing system and a network, in accordance with one or more embodiments of the invention. Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processor(s) (502), non-persistent storage device(s) (504) (e.g., volatile memory, such as random access memory (RAM), cache memory), persistent storage device(s) (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (508) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (512), such as a screen (e.g., a liquid crystal display (LCD), a plasma display, a touchscreen, a cathode ray tube (CRT) monitor, a projector, or other display device), a printer, an external storage, or any other output device. One or more of the output device(s) (512) may be the same or different from the input device(s) (510). The input and output device(s) (510 and 512) may be locally or remotely connected to the computer processor(s) (502), the non-persistent storage device(s) (504), and the persistent storage device(s) (506). Many different types of computing systems exist, and the aforementioned input and output device(s) (510 and 512) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of one or more embodiments of the invention.

The computing system (500) or group of computing systems described in FIG. 5A and FIG. 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (500) of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A—B), and the status flags may be read to determine if the result is positive (i.e., if A>B, then A—B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    extracting data from a plurality of disparate data sources, wherein the data comprises data pairs comprising a corresponding data point and a corresponding time associated with the corresponding data point;
    extracting a plurality of insights from the data at least by identifying a trend in the data pairs;
    forming a model vector comprising the plurality of insights and an additional attribute to the plurality of insights, wherein the additional attribute characterizes the insights, wherein the additional attribute includes at least user feedback comprising a user ranking of a ranked subset of the insights from a user, and wherein forming the model vector comprises:
        converting the plurality of insights and the additional attribute into a data structure comprising a one dimensional matrix formatted and stored for input to a trained insight machine learning model, wherein converting performs a data structure transformation from the plurality of insights and the additional attribute to the one dimensional matrix, and wherein the model vector comprises the one dimensional matrix;
    inputting the model vector into the trained insight machine learning model, wherein the trained insight machine learning model comprises a supervised machine learning model configured for regression analysis;
    executing the trained insight machine learning model on the model vector to obtain, as output, a predicted ranking of the plurality of insights;
    selecting, based on the predicted ranking, a pre-determined number of insights to form predicted relevant insights;
    creating a corresponding contextual description for each of the predicted relevant insights by inserting one or more words from the predicted relevant insights into a sentence template; and
    publishing a text report comprising the corresponding contextual description and a link associated with the corresponding contextual description, wherein the link is selectable by the user to display at least a portion of the data.

2. The method of claim 1, further comprising:
    associating a corresponding link to the corresponding contextual description, wherein the corresponding link comprises a widget selectable to display at least one of the predicted relevant insights and the data from the plurality of disparate data sources.

3. The method of claim 1, further comprising:
    adding the predicted relevant insights to the model vector to form an enhanced model vector;
    inputting the enhanced model vector to the trained insight machine learning model;
    re-selecting a second pre-determined number of insights as second predicted relevant insights; and
    reporting the second predicted relevant insights.

4. The method of claim 1, further comprising:
    prior to inputting the model vector to the trained insight machine learning model, adding, to the model vector, additional data selected from additional sources other than the plurality of disparate data sources.

5. The method of claim 1, wherein the trend comprises one or more of statistically significant trends, statistically significant cycles, and statistically significant outliers.

6. The method of claim 1, wherein the additional attribute is selected from the group consisting of:
    a corresponding statistical P-value for each of the insights;
    a corresponding numerical representation of a sentiment associated with each of the insights;
    an affiliation of an insight to a type of data; and
    combinations thereof.

7. The method of claim 6, wherein the additional attribute includes at least the corresponding numerical representation of the sentiment, and wherein the corresponding numerical representation of the sentiment is provided by the user.

8. The method of claim 6, wherein the corresponding statistical P-value comprises at least one of:
    a personal P-value representing a degree of deviation of a corresponding insight relative to historical data for a corresponding attribute for the user; and a background P-value representing a degree of deviation of corresponding insights relative to the historical data for corresponding attributes for other users different than the user.

9. The method of claim 1, further comprising:

prior to inputting the model vector, training an untrained insight machine learning model to form the trained insight machine learning model.

10. The method of claim 9, wherein training comprises:

iteratively performing, until convergence, steps comprising:
- inputting sample data, taken from the data, into the untrained insight machine learning model;
- calculating an output using the untrained insight machine learning model;
- generating a loss function by determining a difference between the output and a known result; and
- modifying a parameter of the untrained insight machine learning model based on the loss function to form a modified untrained insight machine learning model, wherein, upon convergence, the untrained insight machine learning model is the trained insight machine learning model.

11. The method of claim 10, wherein the loss function includes user feedback.

12. A system comprising:

a data repository storing:
- data from a plurality of disparate data sources, wherein the data comprises data pairs comprising a corresponding data point and a corresponding time associated with the corresponding data point,
- a plurality of insights extracted from the data, the plurality of insights comprising a trend in the data pairs,
- an additional attribute comprising a characterization of at least one of the plurality of insights, wherein the additional attribute include at least a user feedback comprising user rankings, from a user, of a ranked subset of the plurality of insights,
- a model vector comprising a data structure configured for input into a machine learning model, the model vector comprising the plurality of insights and the additional attribute, wherein the data structure further comprises a one dimensional matrix formatted and stored for input to a trained insight machine learning model,
- a pre-determined threshold ranking,
- a predicted ranking of the plurality of insights indicating a ranked order of the plurality of insights in order of predicted relevancy, and
- predicted relevant insights comprising members of the plurality of insights that have greater than the pre-determined threshold ranking in the predicted ranking;

a data extraction engine configured to:
- extract the data from the plurality of disparate data sources;

an insight generation engine configured to:
- extract the plurality of insights from the data, and
- convert the plurality of insights and the additional attribute into the data structure, wherein converting performs a data structure transformation from the plurality of insights and the additional attribute to the one dimensional matrix, and wherein the data structure comprises the model vector;

a trained insight machine learning model configured to:
- predict the predicted ranking, wherein the trained insight machine learning model comprises a supervised machine learning model configured for regression analysis;

an insight selector configured to:
- select the predicted relevant insights from the predicted ranking; and a text generator configured to:
- create a corresponding contextual description for each of the plurality of insights by inserting one or more words from the predicted relevant insights into a sentence template; and
- publishing a text report comprising the corresponding contextual description and a link, wherein the link is selectable by the user to display at least a portion of the data.

13. The system of claim 12, wherein the text generator is further configured to:

associate a corresponding link to the corresponding contextual description, wherein the corresponding link comprises a widget selectable to display at least one of the plurality of insights and the data from the disparate data sources.

14. The system of claim 12, wherein the insight generation engine is further configured to:
- add, to the model vector, additional data selected from additional sources other than the plurality of disparate data sources; and wherein the trend comprises one or more of statistically significant trends, statistically significant cycles, and statistically significant outliers.

15. The system of claim 12, wherein the additional attribute is selected from the group consisting of:
- a corresponding statistical P-value for each of the plurality of insights;
- a corresponding numerical representation of a sentiment associated with each of the plurality of insights;
- an affiliation of an insight to a type of data; and
- combinations thereof.

16. The system of claim 15, wherein:

the additional attribute includes at least the corresponding numerical representation of the sentiment, the corresponding numerical representation of the sentiment is provided by the user, and the corresponding statistical P-value comprises at least one of:
- a personal P-value representing a degree of deviation of a corresponding insight relative to historical data for a corresponding attribute for the user; and
- a background P-value representing a degree of deviation of corresponding insights relative to the historical data for a corresponding attributes for other users different than the user.

17. The system of claim 15, further comprising:

a training system configured to train an untrained insight machine learning model into the trained insight machine learning model.

* * * * *